Patented July 7, 1931

1,813,885

UNITED STATES PATENT OFFICE

HOMER BEHM, OF BELMAR, NEW JERSEY

PROCESS OF TREATING OILS AND PRODUCT THEREOF

No Drawing.    Application filed January 17, 1928. Serial No. 247,456.

The present invention relates to a treatment of mineral oil material, whereby a sort of cracking or splitting of the oil material is effected, separating a soft jelly-like material, and lowering the end boiling point of the oil.

This can be accomplished in a number of different ways, which stated generically includes the production of a readily suspendable material in the oil or the addition to the oil of a readily suspendable material, preferably in the presence of water, the oil being rendered either acid or alkaline in character, sufficiently to change the color of litmus either from blue to red or red to blue, and at this stage preferably a small amount of water is present in the oil. After this the oil material is preferably filtered at this stage, and the mass is over-neutralized either by the addition of an alkali or an acid, sufficiently to turn litmus paper to the opposite color. This produces in the oil a reaction leading to the production of a gelatinous precipitate which generally can be settled from the oil although this settling may be rather slow, and the oil is then preferably filtered to remove the gelatinous material from the oil, as completely as possible.

The gelatinous material thereby produced is of a soft nature, somewhat resembling "vaseline" in appearance, although it may be yellowish or a yellowish-brown, or even white under some conditions, depending upon the procedure and the degree of purity of the mineral oil originally used.

By the term "vaseline" I mean the product which has for many years been on the market under that name, the same being a petroleum jelly or petrolatum with a particular degree of viscosity and "body".

During the first filtration, most of the solid matter in the oil will be removed, but sometimes there may be a small amount of the solid matter which is in colloidal suspension and is not removed by filtration. This, or a portion of the same, may settle out during the formation of the jelly, to give a somewhat gritty feeling to the gelatinous material.

This gelatinous material is itself a novel product which is of use in the industry. It is highly adapted for use in place of dry cleaners' soaps, by being mixed with gasoline, for cleaning clothes and the like. It is also highly suitable for use on leather, say as a belt dressing, since it not only imparts pliability and softness to the leather, but also produces a certain gripping or sticking action for the preventing of the slipping of belts and the like. It is also suitable for application to leather goods, say shoes, to keep the same soft and waterproof. It is also suitable for application to canvas and rubber belting for keeping the same soft and for preventing slipping. The material has also been used in medicine, for colds and the like, by placing a small amount of the same in the nose.

In some cases the grittiness may be objectionable, but after removal of the grittiness, the material can many cases be used as a suitable lubricant.

The properties of the gelatinous material will vary to some extent depending upon the original oil material treated, for example that produced from gasoline has a somewhat waxy feel, although it will evaporate in time. That produced from kerosene is more like soft "vaseline" in consistency, and it has the grease cutting properties of kerosene, and does not evaporate. For producing a wholly satisfactory lubricating product, I prefer to use a refined mineral oil of higher boiling point range than kerosene.

A good many different kinds of mineral oil products may be used in the treatment, for example gasoline, kerosene, heavier mineral oil distillates, crude petroleum of any desired grade, the process being particularly suitable in the case of crude petroleum of say 38° Bé., or lighter.

I call attention to the fact that in all cases, the removal of the jelly-like material appears to considerably lower the end boiling point of the material, to produce a liquid which is highly suitable for burning purposes, as for use in internal combustion engines.

Without restricting myself to the details thereof, I give the following examples of procedure falling within the scope of the invention.

*Example 1.*—For each gallon of kerosene, I add 1 ounce of powdered pure quick lime (or sometimes a somewhat larger amount of slaked lime). I then add 4 ounces of coarsely ground rosin (say from the size of particles of granulated sugar up to the size of wheat) and I then stir the mixture. I add 30 or 32 ounces of strong ammonia water (about 25% strength) and 16 to 18 ounces of 40% formaldehyde solution, the ammonia and the formaldehyde solution being added while the temperature of the liquid is preferably below 60° F. The entire mixture is then allowed to stand for 24 hours at below 60° F. Due to the reactions taking place, there is formed a material of a jelly-like consistency in the mineral oil or kerosene. The jelly will be found to have separated to some extent, a more or less hard layer of the jelly being formed on the top, which may be half an inch thick or so. The entire body of the kerosene may contain more or less flakes of somewhat softer jelly-like material and in the lower part of the kerosene there may be a more or less thread-like formation of jelly-like mass, which may extend clear to the bottom of the kerosene. Not all of the rosin and lime have gone into solution. There will be some water produced or liberated, this being apparently the water which originally held the ammonia and formaldehyde in solution (this being shown by the volume of the water) and this will settle to the bottom of the tank, and a part of this water, say about three-fourths, can readily be drawn off at this stage. The jelly in question is not separated but is left in the oil. There is then added, for each gallon of the original kerosene, 1 pound to 1.5 lbs. of chlorinated lime (25% strength). The liquid gets warm a little, gas is given off with a strong odor, at the beginning, and the liquid gives a noise similar to a boiling liquid, this being apparently in the bottom of the vessel. The temperature may go up to 125° F., or so, during this operation. The action of the chlorinated lime causes the jelly to liquefy or dissolve in the oil, this does not take place immediately, but may require an hour or so. The liquid will be an orange or reddish yellow color at this stage. I let the liquid stand until it cools down to atmospheric temperature which may take about 3 hours in winter temperature (say about freezing temperature), or longer in warm weather.

Then I may add 1 quart of turpentine, and allow the mixture to stand for 4 or 5 hours. This turpentine however may be omitted, also the delay of 4–5 hours. Then I add 2 quarts (64 ounces) or more, of acetone, and stir the mixture. A reaction appears to take place and the chlorinated lime (or the white oil-insoluble reaction products of the same) swells a good deal but does not dissolve. Then I add 6 ounces of glacial acetic acid (preferably previously mixed with say 12 ounces of gasoline) and let the mixture stand for 12 to 14 hours (say over night). The entire mixture is then stirred and filtered. This stirring may cause a slight rise in temperature. The material which I remove by this filtration is a wet pasty white mass, containing some water and the white solid material left from the chlorinated lime.

Six (6) ounces of acetic acid of about 97–98% strength mixed with 12 ounces of acetone are then added to the filtered liquid from the above treatment. The liquid is then well agitated and allowed to stand for 12 hours. I call attention to the fact that the quantity of acetic acid to be added at this stage should be sufficient to make the product slightly acid to litmus. Some reaction takes place, and a very soft, jelly-like material forms gradually in the oily material, which settles out slowly and which gradually hardens somewhat. The oily material is then filtered to remove this jelly-like material. This jelly-like material somewhat resembles ordinary "vaseline" in appearance but may be a little softer than "vaseline" and on rubbing between the hands it develops a somewhat sticky feel. It is readily soluble in gasoline. This gelatinous mass can be used as a soap in dry-cleaning operations. The quantity of this gelatinous material will vary a good deal depending upon the oil under treatment.

I may use as the starting material, either well refined kerosene or well refined gasoline and when using a good grade of gasoline the amount of the gelatinous material may be about 6 ounces per gallon of gasoline, and when using a good grade of kerosene the amount of gelatinous material may be as much as 10 to 12 ounces, per gallon of kerosene.

A distillation test made at this point will show that the end boiling point of the mixture is below that of the original kerosene or gasoline. Thus in a test run using kerosene, the end boiling point of the product was shown to be 500° F., but that of the original kerosene was 565° F. The end boiling point will likewise be lower than that of a gasoline used as the starting material.

The process of treating oils for the production of liquid oil products, in accordance with this example, is claimed in my copending application Serial No. 247,266, filed January 16, 1928.

*Example 2.*—To 1 gallon Oklahoma crude oil of 38–40° Bé., are added to 2 ounces of boric acid, and ½ ounce of soda ash, stir to mix well. Then add ground pulp and peel and juice of an orange, and again stir well to mix. Then add alcoholic solution of an alkali (say caustic soda) mixed with acetone (say 8 ounces alcohol carrying ½ ounce of NaOH, and 12 ounces acetone) enough to make the mixture alkaline, mix by stirring. Then add 1 lb. chlorinated lime, stir, let stand for 10–15 hours (say over night).

Then filter, and acidify with phosphoric acid (say 97% strength), blended with ethyl acetate, or acetone or alcohol. A gelatinous material of a dark color forms. Let stand again over night and filter.

All the above treatment is preferably effected cold (say at or below 60° F.) and it is noted that if the acidulation step is conducted at above 100° F., the gelatinous material does not form.

Instead of boric acid in this example, I could use salicylic acid, oxalic acid, rosin or other acid resin. Instead of soda ash I could use potash, lime or other solid alkali. Instead of the orange I could use lemon or other fruit. Instead of acetone I could use other solvents that will mix with the alcoholic solution and also to some extent with the oil; gasoline might be used. Instead of chlorinated lime, I could use chlorine gas, iodine, bromine, etc. Instead of phosphoric acid I could use acetic (containing at least about 3% of water).

*Example 3.*—To 1 gallon of oil, say kerosene, I may add a solid acid and a solid alkali, say rosin and lime, and add strong acetic acid to acidify (this being preferably first blended with two volumes of gasoline). Add 2-3 ounces of chlorinated lime. Stir to mix. Let stand over night. Add one ounce of water, stir, let stand an hour or two, filter, then make slightly alkaline with ammonia water or alcoholic soda solution (containing say 3-4% of water). Shake well. Let stand 12 hours or so, when the gelatinous precipitate can be separated from the oil by filtration.

A particular property of the gelatinous material constituting one of the products of the present case, which is of importance, is its use in dry-cleaning. For ordinary dry-cleaning, instead of using gasoline alone, or gasoline with dry-cleaners' soap, a small amount of the gelatinous product of the present case may be employed with the gasoline, for example about ¼ ounce up to one ounce, per gallon of gasoline, the said material being first dissolved in the gasoline and the clothes then washed in the mixture. For the removal of very greasy spots from the clothing, they may be rubbed with a small amount of the gelatinous material, and then thrown into the bath of gasoline, this removing the greasy spots.

I claim:—

1. In the treatment of mineral oil material the herein described process which comprises providing in the oil, the reaction products of lime, rosin, formaldehyde, ammonia and chlorinated lime, the mixture thereof with the oil having sufficient reaction to change the color of litmus, and the oil containing some water, and then over-neutralizing the reaction of the mixture, to thereby form a gelatinous precipitate, and separating such gelatinous precipitate from the oil.

2. The process of treating mineral oil which comprises suspending the reaction products of boric acid, alcohol, caustic soda, chlorinated lime, phosphoric acid and ground orange material, in the oil and giving the mixture a sufficient reaction to change the color of litmus, allowing to stand for a time, removing the insoluble matter capable of removal by filtration, then over-neutralizing to cause the mixture to change the color of litmus in the opposite direction, whereby a gelatinous material is precipitated and removing the latter.

3. A gelatinous product produced by the process of claim 1, having a consistency resembling soft "vaseline" soluble in gasoline, such product, when applied to a leather belt, having an adhesive property, whereby slipping of the belt is decreased, which product when dissolved in gasoline has detergent properties.

In testimony whereof I affix my signature.

HOMER BEHM.